(12) United States Patent
Claussen et al.

(10) Patent No.: US 6,666,078 B1
(45) Date of Patent: Dec. 23, 2003

(54) TARGET TIRE PRESSURE LEARNING METHOD

(75) Inventors: Stephen P. Claussen, Richland, MI (US); James A. Beverly, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/006,276

(22) Filed: Dec. 4, 2001

(51) Int. Cl.[7] .......................... G01M 17/02; B60C 23/02
(52) U.S. Cl. ........................................ 73/146; 73/146.3
(58) Field of Search ................................. 73/146–146.8; 152/415–419

(56) References Cited

U.S. PATENT DOCUMENTS

| | | | |
|---|---|---|---|
| 2,695,122 A | 11/1954 | Learman | 226/20.6 |
| 4,441,539 A | 4/1984 | Hulse | 152/417 |
| 4,506,708 A | 3/1985 | Onuma | 141/4 |
| 4,619,303 A | 10/1986 | Bryan et al. | 152/416 |
| 4,640,331 A | 2/1987 | Braun et al. | 152/417 |
| 4,678,017 A | 7/1987 | Schultz | 152/416 |
| 4,708,184 A | 11/1987 | Pechar | 152/417 |
| 4,724,879 A | 2/1988 | Schultz et al. | 152/416 |
| 4,744,399 A | 5/1988 | Magnuson et al. | 152/417 |
| 4,754,792 A | 7/1988 | Braun et al. | 152/417 |
| 4,763,709 A | 8/1988 | Scholer | 152/416 |
| 4,782,878 A | 11/1988 | Mittal | 152/817 |
| 4,782,879 A | 11/1988 | Le Chatelier et al. | 152/417 |
| 4,825,925 A | 5/1989 | Schultz | 152/415 |
| 4,860,579 A | 8/1989 | Beverly | 73/146.2 |
| 4,875,509 A | 10/1989 | Da Silva | 141/38 |
| 4,883,105 A | 11/1989 | Schultz | 152/416 |
| 4,883,106 A | 11/1989 | Schultz et al. | 152/417 |
| 4,893,664 A | 1/1990 | Oltean | 152/416 |
| 4,898,216 A | 2/1990 | Schultz et al. | 141/4 |
| 4,905,742 A | 3/1990 | Mohs | 141/38 |
| 4,917,163 A | 4/1990 | Schultz | 152/415 |
| 4,922,946 A | 5/1990 | Boulicault | 137/102 |
| 4,924,926 A | 5/1990 | Schultz et al. | 152/417 |
| 5,121,774 A | 6/1992 | Hicks et al. | 141/4 |
| 5,174,839 A | 12/1992 | Schultz et al. | 152/415 |
| 5,179,981 A | 1/1993 | Hicks et al. | 141/4 |
| 5,180,456 A | 1/1993 | Schultz et al. | 152/416 |
| 5,249,609 A * | 10/1993 | Walker et al. | 141/4 |
| 5,253,687 A | 10/1993 | Beverly et al. | 152/416 |
| 5,273,064 A | 12/1993 | Beverly et al. | 137/102 |
| 5,291,776 A | 3/1994 | Mallison | 73/146 |
| 5,309,969 A | 5/1994 | Mittal | 152/415 |
| 5,313,995 A | 5/1994 | Schultz | 152/416 |
| 5,429,166 A * | 7/1995 | Anzai et al. | 152/415 |
| 5,505,080 A | 4/1996 | McGhee | 731/146.5 |
| 5,516,379 A | 5/1996 | Schultz | 152/415 |

(List continued on next page.)

FOREIGN PATENT DOCUMENTS

| EP | 0 531 070 A3 | 3/1993 |
|---|---|---|
| EP | 0 531 070 A2 | 3/1993 |

OTHER PUBLICATIONS

Cameron, David S. and Frank, David A, "Tire Pressure Management System," 2244 Research Disclsoure No. 342 (Oct. 1992).

Primary Examiner—Edward Lefkowitz
Assistant Examiner—Jermaine Jenkins
(74) Attorney, Agent, or Firm—Dykema Gossett PLLC (57) ABSTRACT

A target tire pressure learning method wherein tire pressure is ascertained via a central pressure sensor. The method of learning a target tire pressure for a tire maintained by a tire pressure maintenance system, having conduit assemblies for conducting fluid to and/or from the tire and a pressure sensor for ascertaining fluid pressure in the conduit assemblies, according to the invention includes ascertaining a current tire pressure with the pressure sensor and designating the current tire pressure as a target tire pressure.

20 Claims, 3 Drawing Sheets

U.S. PATENT DOCUMENTS

| | | | |
|---|---|---|---|
| 5,540,268 A | 7/1996 | Mittal | 152/415 |
| 5,553,647 A | 9/1996 | Jaksic | 152/415 |
| 5,600,301 A | 2/1997 | Robinson, III | 340/442 |
| 5,611,875 A | 3/1997 | Bachhuber | 152/415 |
| 5,629,873 A | 5/1997 | Mittal et al. | 364/558 |
| 5,629,874 A | 5/1997 | Mittal | 364/558 |
| 5,674,332 A | 10/1997 | Battocchio | 152/416 |
| 5,838,229 A | 11/1998 | Robinson, III | 340/442 |
| 6,067,850 A | 5/2000 | Lang et al. | 73/146.8 |
| 6,098,682 A | 8/2000 | Kis | 152/415 |
| 6,246,317 B1 | 6/2001 | Pickornik et al. | 340/447 |
| 6,250,327 B1 | 6/2001 | Freigang et al. | 137/225 |
| 6,283,186 B1 | 9/2001 | Krisher | 152/417 |
| 6,293,147 B1 | 9/2001 | Parker et al. | 73/462 |

* cited by examiner

TARGET TIRE PRESSURE LEARNING METHOD

BACKGROUND OF THE INVENTION

Conventional tire pressure management systems typically have central tire inflation systems (CTI systems), also known as on-board inflation systems and traction systems. These tire pressure management systems are well known, as may be seen by reference to the following U.S. Pat. Nos.: 5,516,379; 5,313,995; 5,273,064; 5,253,687; 5,180,456; 5,179,981; 5,174,839; 5,121,774; 4,924,926; 4,922,946; 4,917,163; 4,893,664; 4,883,106; 4,883,105; 4,825,925; 4,782,879; 4,754,792; 4,724,879; 4,678,017; 4,640,331; and 4,619,303. The entire disclosure of each of these patents is incorporated herein.

Generally, tire pressure management systems employ a pneumatically controlled wheel valve that is affixed to each vehicle wheel assembly for controlling tire pressure in response to pressure signals from a fluid control circuit. The fluid control circuit is connected to each wheel valve via a rotary seal assembly associated with each wheel valve. In some systems, tire pressure is monitored by means of a sensor that is positioned in a conduit assembly in the fluid control circuit. When the wheel valve and certain control valves are opened, the pressure in the conduit assembly equalizes to tire pressure which can be sensed by the sensor. An electronic control unit receives electrical pressure signals generated by the sensor and appropriately controls the fluid control circuit in response thereto for inflating or deflating a selected tire.

Prior vehicular systems exist which use pressure sensors/transmitters located in each tire that transmit pressure information to a receiver. Each sensor/transmitter may have an identification code associated therewith which enables the receiver to know which sensor/transmitter the pressure information is received from. The receiver analyzes the pressure information and, in some systems, displays current pressure information to the vehicle's operator via a mounted display. Some systems also contemplate the provision of a warning signal to the operator in the situation where the tire pressure is determined to be low. See, for example, U.S. Pat. No. 5,600,301, the disclosure of which is incorporated herein.

Some tire pressure maintenance systems provide for "learning" a tire pressure by measuring and registering the pressure of a particular tire. However, such systems either are limited to multiple, tire-designated pressure sensor applications or do not include the learning of an ultimate target tire pressure. See, for example, U.S. Pat. Nos. 6,246,317 and 5, 309,969.

Practical application of "target tire pressure learning" tire management systems which dedicate a pressure sensor to each tire for measure the fluid pressure therein is costly and limits utility to only those vehicles having tire-specific pressure sensors. What is needed is a target tire pressure learning method wherein tire pressure is ascertained via a central pressure sensor.

SUMMARY OF THE INVENTION

The invention provides a target tire pressure learning method wherein tire pressure is ascertained via a central pressure sensor. The method of learning a target tire pressure for a tire maintained by a tire pressure maintenance system, having conduit assemblies for conducting fluid to and/or from the tire and a pressure sensor for ascertaining fluid pressure in the conduit assemblies, according to the invention includes ascertaining a current tire pressure with the pressure sensor and designating the current tire pressure as a target tire pressure.

The invention provides improved elements and arrangements thereof, for the purposes described, which are inexpensive, dependable and effective in accomplishing intended purposes of the invention. Other features and advantages of the present invention will become apparent from the following description of the preferred embodiments, which refers to the accompanying drawings.

BRIEF DESCRIPTION OF THE DRAWINGS

The invention is described in detail below with reference to the following figures, throughout which similar reference characters denote corresponding features consistently, wherein.

DETAILED DESCRIPTION OF THE PREFERRED EMBODIMENTS

The invention is a target tire pressure learning method wherein tire pressure is ascertained via a central pressure sensor. "Target tire pressure," as used herein, means the final tire pressure desired during steady state operation of a vehicle. "Target tire pressure" does not include temporary values accessed or manipulated in the course of obtaining a final tire pressure. The method may be achieved with known tire pressure management systems, such as the exemplary tire pressure management system described below.

Figure 1:
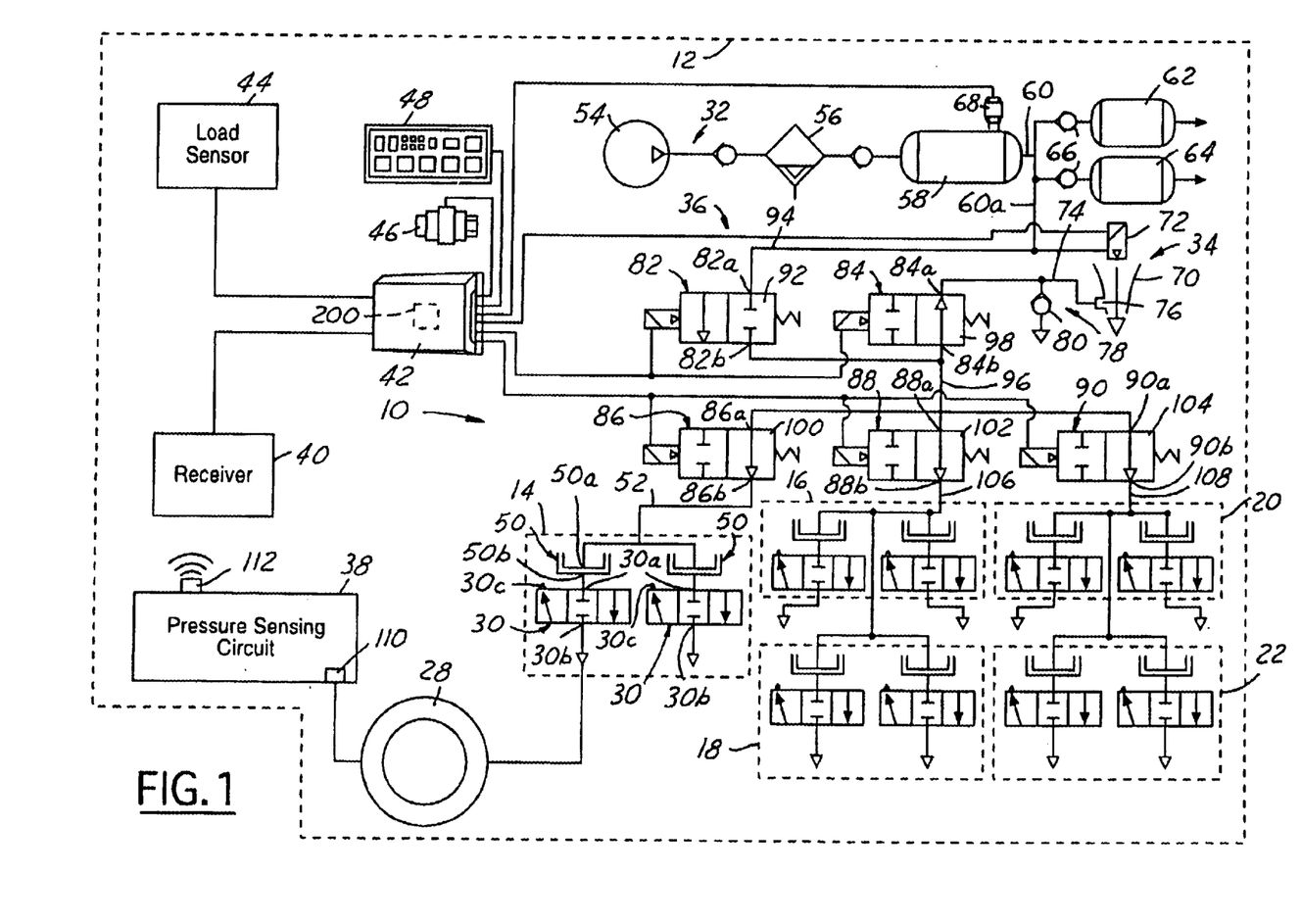
FIG. 1 is a diagrammatic view of a tire pressure management system for a vehicle, a vehicle incorporating same being shown in dotted line.

FIG. 1 shows a tire pressure management system 10 for a vehicle 12 for describing, but not limiting applicability of the invention. Vehicle 12 may be, but is not limited to being a tractor-trailer. The system may be used in connection with a wide variety of vehicles, including automobiles.

Figure 2:
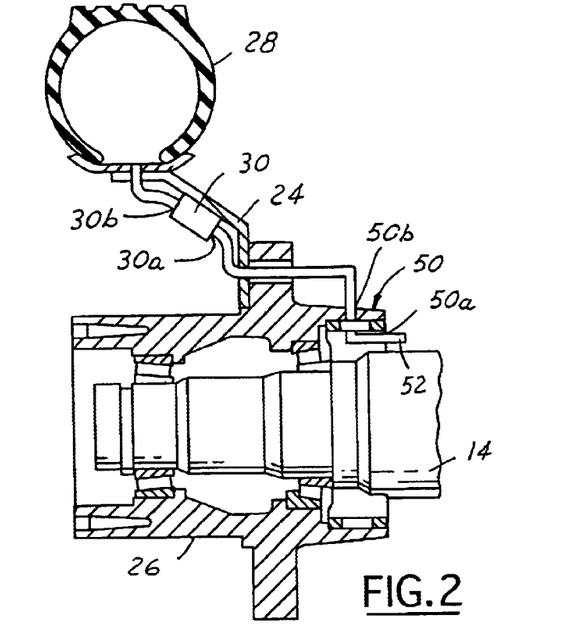
FIG. 2 is a cross-sectional detail view of a conventional vehicle wheel assembly.

Vehicle 12 may include a plurality of axles, including a steer axle 14, a tandem axle assembly having drive axles 16, 18 and another tandem axle assembly having trailer axles 20, 22. As shown in greater detail in FIG. 2, each axle, such as drive axle 14, may include wheels 24 affixed to wheel hubs 26 disposed at each outboard end of the axle and rotationally supported on axle 14. Each wheel 24 may include one or more inflatable tires 28 mounted thereon.

System 10 monitors and controls pressure within each tire 28 of vehicle 12. System 10 may include wheel valve assemblies 30, a fluid source 32, a vacuum source 34, and a fluid control circuit 36. System 10 may further include at least a sensor 200, one or more electronic control units 42, one or more load sensors 44, a speed sensor 46, and an operator control device 48.

Wheel valve assemblies 30 are provided to control the flow of pressurized fluid into and out of tires 28. Valve assembly 30 is mounted to each end of each axle and is connected to the remainder of system 10 through a rotary seal connection 50. Wheel valve assembly 30 is conventional in the art and may include the wheel valve assembly described and illustrated in U.S. Pat. No. 5,253,687 or U.S.

Pat. No. 6,250,327, the entire disclosures of which are incorporated herein.

Rotary seal assembly 50 also is conventional in the art and may include the rotary seal assembly described and illustrated in U.S. Pat. No. 5,174,839, the entire disclosure of which also is incorporated herein.

Referring again to FIG. 2, wheel valve assembly 30 may include an inlet port 30*a* coupled to a rotatable port 50*b* of rotary seal assembly 50, an outlet port 30*b* in fluid communication with the interior of tire 28, and an exhaust port 30*c*, best shown in FIG. 1. Rotary seal assembly 50 may further include a non-rotatable port 50*a* connected to a conduit 52 of fluid control circuit 36. Valve assembly 30 assumes a closed position, as illustrated in FIG. 1, when the fluid pressure at inlet port 30*a* is substantially atmospheric, an open position connecting inlet port 30*a* and outlet port 30*b* when the fluid pressure at inlet port 30*a* is a positive pressure, and an exhaust position connecting outlet port 30*b* and exhaust port 30*c* when the fluid pressure at inlet port 30*a* is a negative pressure.

Fluid source 32 provides positive pressurized fluid to system 10 and tires 28. Fluid source 32 is conventional in the art and may include a pressure source, such as a pump 54, an air dryer 56, and a first fluid tank 58 connected via a conduit 60 to the brake system fluid tanks 62, 64 and to the fluid control circuit 36 via a branch conduit 60*a*. Check valves 66 prevent sudden loss of fluid pressure in brake tanks 62, 64 in the event of upstream pressure loss. A pressure sensor 68 monitors pressure within tank 58 and provides a pressure indicative signal to electronic control unit 42.

Vacuum source 34 produces a negative pressure in system 10 to decrease fluid pressure in tires 28 of vehicle 12. Vacuum source 34 also is conventional in the art and may include a vacuum generator 70 controlled through a solenoid valve 72. A low pressure zone is produced by passing fluid through a venturi like portion of vacuum generator 70. Upon urging solenoid valve 72 into an open position via a control signal from electronic control unit 42, a vacuum or negative fluid pressure, relative to atmospheric pressure, is introduced in a conduit 74, which has a small orifice 76 disposed proximate the low pressure zone produced by generator 70. Conduit 74 also is connected to a one-way vent valve 78 for rapid venting of positive fluid pressure from conduit 74. Vent valve 78 includes a valving member 80 that is drawn into a closed position in response to negative fluid pressure in conduit 74 and is urged into an open position in response to positive pressure fluid in conduit 74.

Fluid control circuit 36 directs the flow of pressurized fluid within system 10 for controlling pressure in tires 28 of vehicle 12. Control circuit 36 may include a pair of pressure control valves 82, 84 and a plurality of axle distribution valves 86, 88, 90. As shown, a single fluid control circuit 36 controls pressure in all of the tires 28 of vehicle 12. However, control circuit 36, and other portions of system 10, may be replicated so that, for example, one control circuit 36 may control tire pressures in the tractor portion of vehicle 12 and another control circuit 36 may control tire pressure in the trailer portion of vehicle 12.

Pressure control valve 82 directs positive pressurized fluid from fluid source 32 to tires 28 of vehicle 12. Valve 82 may include a conventional two position-two way, solenoid controlled and pilot fluid operated valve. Valve 82 includes a valving member 92 that is spring biased toward a closed position, as shown in FIG. 1. Valving member 92 assumes an open position in response to energizing of a solenoid operatively associated therewith via control signals from electronic control unit 42. Valve 82 has a first port 82a coupled to a conduit 94 leading to fluid source 32. Valve 82 has a second port 82b coupled to another conduit 96 leading to axle distribution valves 86, 88, 90.

Pressure control valve 84 vents control circuit 36. Valve 84 is conventional in the art and may also include a two position-two way, solenoid controlled and pilot fluid operated valve. Valve 84 includes a valving member 98 that is spring biased toward an open position, as shown in FIG. 1. Valving member 98 assumes a closed position in response to energizing a solenoid operatively associated therewith via control signals from electronic control unit 42. Valve 84 has a first port 84*a* coupled to conduit 74 leading to orifice 76. Valve 84 has a second port 84*b* coupled to conduit 96 leading to axle distribution valves 86, 88, 90.

Axle distribution valves 86, 88, 90 limit the supply of positive pressurized fluid to, or the release of fluid from, the tires 28 of one or more axles 14, 16, 18, 20, 22 of vehicle 12. Valves 86, 88, 90 are conventional in the art and may include two position-two way, solenoid controlled and pilot fluid operated valves. Valves 86, 88, 90 direct the flow of fluid to and from the tires 28 of axles 14, 16 and 18, and 20 and 22, respectively. Each of valves 86, 88, 90 includes a valving member 100, 102, 104, respectively, that is spring-biased toward an open position, as shown in FIG. 1, and which assumes a closed position in response to energizing a solenoid operatively associated therewith via electrical signals from electronic control unit 42. Each of valves 86, 88, 90 respectively has first ports 86*a*, 88*a*, 90*a* coupled to conduit 96. Each of valves 86, 88, 90 respectively has second ports 86*b*, 88*b*, 90*b* leading to respective corresponding conduits 52, 106, 108 for each axle or tandem axle of vehicle 12.

Although axle distribution valves 86, 88, 90 are shown, individual tire distribution valves could be used in conjunction with axle distribution valves 86, 88, 90 or as an alternative to axle distribution valves 86, 88, 90 to further control the flow of fluid to and from individual tires 28 of vehicle 12. Further, although only three axle distribution valves 86, 88, 90 are shown, the number of axle distribution valves may be varied depending upon the number of axles of vehicle 12 and to allow for greater individual control of the tires 28 of vehicle 12.

Sensor 200 may be electrically integrated with electronic control unit 42. Sensor 200 is disposed in fluid communication with conduit assemblies for conducting fluid to and/or from tires 28. Sensor 200 may transmit a parameter signal indicative of a measured parameter associated with a corresponding tire 28 of vehicle 12. The parameter may be fluid pressure or another value, such as tire temperature, that may be indicative of tire pressure.

Figure 3:
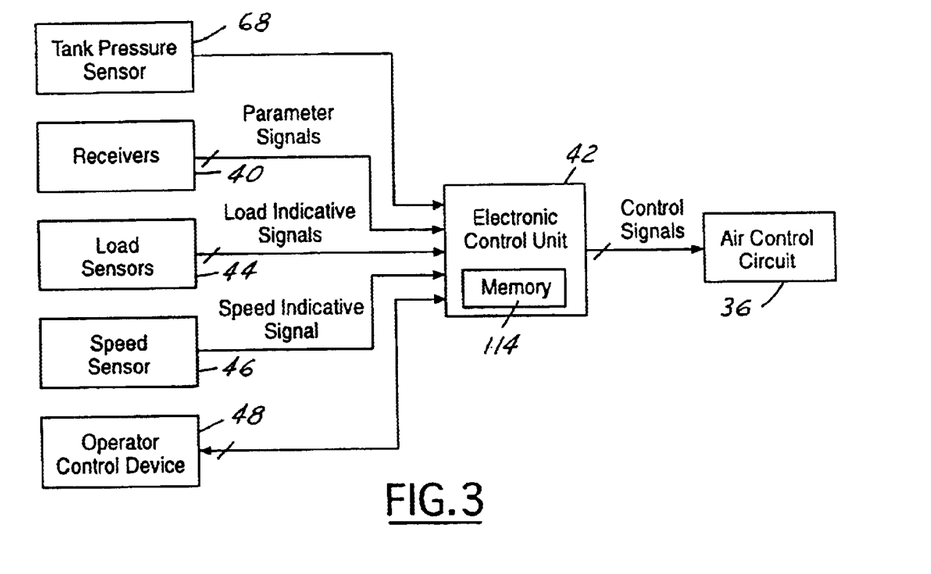
FIG. 3 is a schematic view of components of the system of FIG. 1.

Referring to FIG. 3, electronic control unit 42 controls fluid control circuit 36. Control unit 42 may include a microprocessor operating under the control of a set of programming instructions commonly referred to as software. Electronic control unit 42 may include a memory 114 in which the programming instructions are stored. Memory 114 also may contain identification codes for each tire 28 of vehicle 12 to uniquely identify the particular tire 28 to which a particular parameter signal corresponds. Memory 114 also may be used to record tire pressure values or user inputs over a period of time to assist in evaluating tire pressure management.

Control unit 42 may receive input signals from sensor 200, one or more load sensors 44, speed sensor 46, and operator control device 48. Control unit 42 outputs a plurality of control signals to control valves 82, 84, 86, 88, 90 of fluid control circuit 36 and solenoid valve 72 of vacuum source 34. Control unit 42 also may generate a plurality of output signals to a display device which may include a part of operator control device 48 or a freestanding device. The latter signals may be used to trigger the display pressure readings and/or deflection levels for each vehicle tire 28, the load on vehicle 12 or a portion of it, and the speed of vehicle 12. The signals may also be used to trigger warnings to the operator of vehicle 12 in the event that pressure cannot be maintained in one of the vehicle tires 28, the pressure exceeds or falls below predetermined maximum and minimum tire pressure values, or the pressure differs from a target tire pressure value by more than a predetermined amount.

Load sensors 44 provide an indication as to the load on vehicle 12 and, consequently, tires 28 of vehicle 12, or the load on some portion of vehicle 12 and, consequently, select tires 28 of vehicle 12. Load sensors 44 are conventional in the art and load sensing may be provided in a variety of known ways, including through analysis of pneumatic pressure in the suspension of vehicle 12, analysis of powertrain parameters, the use of displacement transducers, or the implementation of load beams and strain gauges. Each load sensor 44 may provide one or more signals to electronic control unit 42 indicative of the load bearing on vehicle 12 or a portion thereof.

Electronic control unit 42 may initiate pressure adjustment in tires 28 of vehicle 12 in response to signals from load sensors 44 in a variety of ways. For example, electronic control unit may cause an increase or decrease in the pressure in one or more tires 28 responsive to a corresponding increase or decrease in vehicle load based on a variety of linear or non-linear functions. One or more tire deflection tables may be stored in a memory, such as memory 114, and accessed by electronic control unit 42 responsive to the signals from load sensors 44.

Speed sensor 46 measures the speed of vehicle 12 to further control deflection levels for tires 28. High deflection levels can create safety concerns and reduce tire life if maintained while vehicle 12 is operating at relatively high speeds. Speed sensor 46 is conventional in the art and provides a signal to electronic control unit 42 corresponding to speed.

Operator control device 48 may allow the operator of vehicle 12 to exert at least some level of control over system 10. Device 48 is conventional in the art and may include a plurality of input/output devices, such as a keypad, touch screen, switches or similar input devices, and a display screen, sound generator, lights or similar output devices. Thus, device 48 permits an operator of vehicle 12 to transmit control signals to electronic control unit 42 to adjust pressure levels within the tires 28 of vehicle 12. The control signals may, for example, correspond to deflection levels for tires 28 of vehicle 12. As a result, the operator is able to adjust the deflection level of the tires 28 to correspond to the terrain over which vehicle 12 is traveling. Such control is desirable to provide improved floatation and traction on certain terrain.

The sequencing and interaction of components of system 10 may be appreciated more readily in the context of the following description of the present method.

Figure 4:
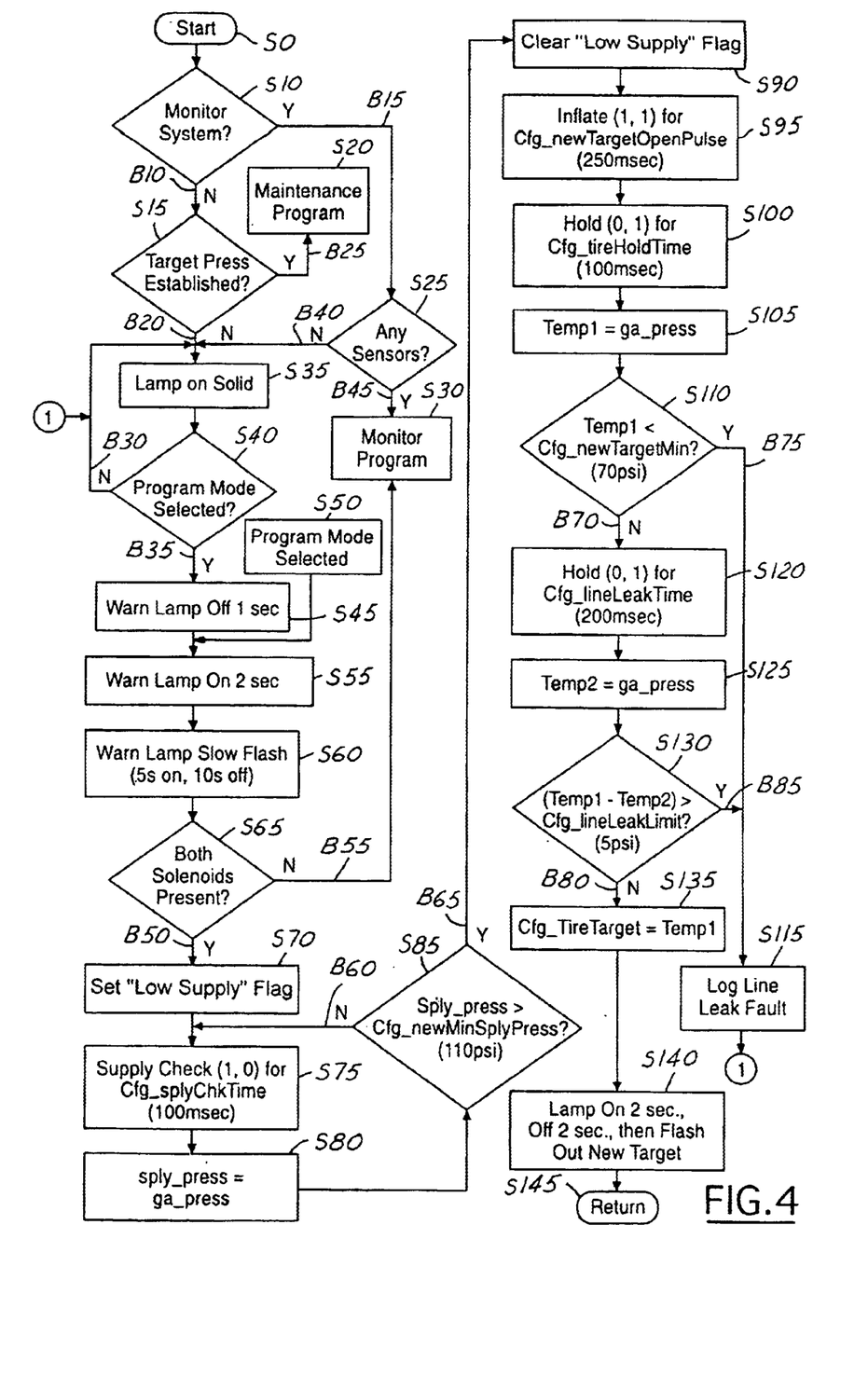
FIG. 4 is a schematic view of a flow chart for a method configured according to the invention.

FIG. 4 diagrammatically shows a flow chart of the present method. The method may be called upon initiation of system 10, at. step S0. Control unit 42 then passes control to step S10.

At step S10, the invention provides for determining whether system 10 is configured only to monitor tire pressure or configured to maintain or otherwise impact tire pressure. Control unit 42 determines whether a flag has been set identifying system 10 as a monitor-only system. In practice, control unit 42 is programmed with a default mode whereby control unit 42 presumes that system 10 is a maintenance, not a monitor, system. When control unit 42 senses a monitor flag has been set, system 10 is likely to have remotely located tire pressure sensors (not shown) dedicated to each tire 28, and not fluid control mechanisms, such as solenoids or conduit assemblies for supplying or removing fluid from tires 28. In monitor mode, control unit 42 is not permitted to execute routines which would require the foregoing fluid control mechanisms. Accordingly, if control unit 42 senses a flag indicating that system 10 is a monitor system, control unit 42 passes control along branch B15 to step S25, described below. However, if control unit 42 does not sense a flag indicating that system 10 is a monitor system, control unit 42 passes control along branch B10 to step S15.

At step S15, the invention provides for determining whether a target tire pressure, defined above, has been established. For example, control unit 42 may check the contents of a target tire pressure variable stored in a memory accessible to control unit 42. If a target tire pressure variable exists, control unit 42 passes control along branch B25 to step S20. If a target tire pressure variable does not exist, control unit 42 passes control along branch B20 to step S35, described below.

At step S20, the invention provides for executing a tire pressure maintenance program (not shown). Preferably, such maintenance program is based on that described in the U.S. Patent applications filed contemporaneously herewith associated with Ser. Nos. 10/004,751 and 10/004,719.

At step S25, the invention provides for ascertaining whether the requisite remotely-located, tire-specific pressure sensors (not shown), described above with respect to step S10, are programed to be controlled by control unit 42, as described with respect to step S10. If control unit 42 detects that the sensors are programed into a memory thereof, control unit 42 passes control along branch B45 to step S30. If the sensors are not programed, control unit 42 passes control to and along branches B40 and B20 to step S35, described below.

At step S30, the invention provides for executing a monitoring program (not shown) to receive and process signals transmitted from the sensors, such as signals corresponding to conduit assembly or tire pressure.

At step S35, the invention provides for illuminating a lamp. The illuminated lamp is intended to alert an operator that no target tire pressure has been established, effectively disabling system 10 from being able to maintain an appropriate tire pressure. The lamp remains illuminated indefinitely until the operator elects to have control unit 42 initiate a target tire pressure learning routine. Control unit 42 then passes control to step S40.

At step S40, the invention provides for determining whether the operator desires to have control unit 42 initiate a routine to learn a target tire pressure. Control waits indefinitely, with the warning lamp illuminated, for operator input. Once the operator has been alerted of a target tire pressure value deficiency in step S35, the operator, satisfied with the current tire pressure, could immediately instruct control unit 42 to accept same as the target tire pressure. Operator also could adjust tire pressure in tires 28 and thereafter instruct control unit 42 to accept the adjusted tire pressure as the target tire pressure. If the operator elects not to have control unit 42 learn a target tire pressure, control loops around and passes control along branches B30 and B20 back to step S35, described above. If the operator elects to have control unit 42 learn a target tire pressure, control unit 42 passes control along branch B35 to step S45 to initiate a warning sequence prior to initiating the routine to learn a target tire pressure.

At step S45, the invention provides for extinguishing the lamp illuminated in step S35. This frees-the lamp from the control established thereover at step S35 and allows for subsequent control. Control unit 42 then passes control to step S55, described below.

At step S50, the invention provides for initiating a target tire pressure learning routine upon the election of an operator to have control unit 42 learn a target tire pressure, other than when control unit 42 detects that no target tire pressure value exists. For example, the operator may encounter new surface conditions for which a different target tire pressure would be more appropriate. The operator then may initiate an inflation or deflation routine, or manually undertake same, then instruct control unit 42 to learn the recently established pressure as the new target tire pressure. Control unit 42 then passes control to step S55.

At step S55, the invention provides for illuminating a lamp for a duration. The illuminated lamp is intended to alert the operator that control unit 42 is about to initiate a target tire pressure learning routine. The operator, thus alerted, cognizant that a new target tire pressure value is about to be established, would refrain from adjusting tire pressure during the impending learning routine. The operator also may have an opportunity to cancel the anticipated initiation of a learning routine. Control unit 42 then passes control to step S60.

At step S60, the invention provides for intermittently illuminating the lamp for a second duration. This alerts the operator that control unit 42 is executing the learning routine. The duration extends through step S140 unless, at step S110 a line leak fault is determined to exist, in which case the lamp is illuminated continuously, as described above with respect to step S35. Following the second duration, control unit 42 passes control to step S65.

At step S65, the invention provides for determining whether requisite solenoids are present. This ensures that solenoids 82, 84, 86, 88 and 90 are functioning and electronically operable under the control of control unit 42. This also verifies whether control unit 42, which by default operates under the assumption that system 10 is a maintenance-type system, described above with respect to step S10. Accordingly, if control unit 42 detects that the requisite solenoids are present, control unit 42 passes control along branch B50 to step S70, described below. If control unit 42 detects that the requisite solenoids are not present, control unit 42 passes control along branch B55 to step S30, described above.

At step S70, the invention provides for setting a "low supply" flag. Setting the "low supply" flag preliminarily to actually checking the supply pressure in fluid source 32 serves as a safety measure designed ensure that the flag is set despite problems that may develop during the ensuing supply pressure checking routine. The "low supply" flag is cleared only if the supply pressure checking routine executes normally and returns an appropriate value. Thus, if the supply pressure checking routine returns an incorrect value or does not execute properly, and supply pressure is insufficient to bring the pressure of tires 28 up to the target tire pressure, as determined in step S85 described below, the operator is alerted that a supply pressure problem exists. Control unit 42 then passes control to step S75.

At step S75, the invention provides for supplying compressed fluid from fluid source 32 to, for example, conduit assemblies in fluid communication with sensor 200. This step is intended to enable sensor 200 to ascertain the pressure of the fluid provided by fluid source 32. In this embodiment, control unit 42 instructs solenoid 82 to open, and solenoids 86, 88 and 90 to close, thereby enabling fluid communication among fluid source 32, conduit assemblies for conducting fluid to solenoids 86, 88 and 90, and sensor 200, for a brief duration. Control unit 42 then passes control to step S80.

At step S80, the invention provides for ascertaining the pressure of fluid supplied by the pulse provided in step S75 and saving same as a supply pressure value. Control unit 42 then passes control to step S85.

At step S85, the invention provides for ascertaining whether the supply pressure is greater than a manufacturer-configured, or manufacturer designated, minimum supply pressure value. The minimum supply pressure value represents a minimum pressure needed to be able to ensure correct measurement of fluid pressure in tires 28 to enable establishing a new target tire pressure. If the supply pressure value, obtained in step S80, is not greater than the manufacturer-configured minimum supply pressure, control unit 42 cycles back through step S75 to continue to monitor supply pressure in fluid source 32, therefore control unit 42 passes control along branch B60 to step S75. An alternative embodiment of the invention provides for establishing a fault or otherwise alerting the operator or terminating the routine if the supply pressure is inadequate to allow for measuring fluid pressure in tires 28. If the supply pressure value is greater than the minimum supply pressure, control unit 42 passes control along branch B65 to step S90.

At step S90, the invention provides for clearing the "low supply" flag. Because supply pressure is adequate to initiate tire inflation or maintenance; the "low supply" flag set as a precaution in step S70 no longer is needed or appropriate. Control unit 42 then passes control to step S95.

At step S95, the invention provides for pressurizing the conduit assemblies in fluid communication with control valve assembly 30. The pulse has a duration, configured or designated by the manufacturer, sufficient to pressurize the conduit assemblies sufficiently to open control valve assembly 30 and initiate fluid communication with tires 28, but, preferably, not increase the pressure of tires 28. In practice, pressure in tires 28 may increase slightly, but such should be minimized. Control unit 42 instructs solenoids 82 and 86, 88 and/or 90 to open, and solenoid 84 to close, thereby initiating fluid communication among fluid source 32, tires 28 and conduit assemblies therebetween, for the pulse duration. After the pulse duration, control unit 42 passes control to step S100.

At step S100, the invention provides for allowing the conduit assemblies and tires 28 to reach equilibrium. Control unit 42 closes solenoid 82 and maintains solenoids 86, 88 and/or 90 open for a manufacturer-configured, or manufacturer designated, duration. Thereafter, control unit 42 passes control to step S105.

At step S105, the invention provides for ascertaining the gage pressure in conduit assemblies. Since the conduit assemblies are at equilibrium with tires 28, the gage pressure measured in the conduit assemblies equals the current fluid pressure in tires 28. The pressure in the conduit assemblies, preferably, is measured with sensor 200. Control unit 42 saves the pressure measurement as a temporary variable "temp1." Control unit 42 then passes control to step S110.

At step S110, the invention provides for determining whether the current tire pressure is less than a new target tire pressure minimum value. The new target tire pressure minimum value is needed to ensure proper functioning of other components of system 10, or other systems, such as the functioning of pressure protection valves (not shown) designed to ensure that higher priority systems, such as braking systems, enjoy superior rights to fluid source 32. The new target tire pressure minimum value may be configured or designated by the manufacturer. If the current tire pressure, "temp1," is not less than the new target tire pressure minimum value, control unit 42 passes control along branch B70 to step S125, described below. If the current tire pressure is less than the new target tire pressure minimum value, control unit 42 passes control along branch B75 to step S115.

At step S115, the invention provides for logging a line leak fault. This alerts the operator that elements of system 10, such as the conduit assemblies or solenoids, have failed or merit servicing. Control unit 42 then passes control to and along branches B30 and B20 back to step S35, described above.

At step S120, the invention provides for initiating a line leak checking routine. Similar to step S100, control unit 42 instructs solenoid 82 to close and solenoids 86, 88 and/or 90 to open for a manufacturer-configured, or manufacturer designated, duration. The duration of this step is longer than the duration of step S100 to allow sufficient time for an appreciable amount of fluid in the conduit assemblies to escape from a significant leak therethrough. Thereafter, control unit 42 passes control to step S125.

At step S125, the invention provides for ascertaining the pressure of fluid remaining in the conduit assemblies following the duration of step S120. The pressure in the conduit assemblies, preferably, is measured with sensor 200. Control unit 42 then saves the pressure measurement as a temporary variable "temp2." Control unit 42 then passes control to step S130.

At step S130, the invention provides for determining whether a difference between the pressure measured prior to the line leak checking routine and the pressure measured thereafter exceeds a limit. If the pre-line leak check pressure exceeds the post-line leak check pressure, the conduit assemblies exhibit significant fluid, hence fluid pressure, loss. Therefore, if the difference between "temp1" and "temp2" exceeds a manufacturer-configured, or manufacturer designated, limit, control unit 42 then passes control to and along branches B85 and B75 to step S115, described above. If the difference between "temp1" and "temp2" does not exceed the limit, control unit 42 passes control along branch B80 to step S135.

At step S135, the invention provides for establishing the current tire pressure as the target tire pressure. Control unit 42 recalls the value of temporary variable "temp1," described in step S105, and saves same in the tire target tire pressure variable. Temporary variable "temp2" is not stored as the target tire pressure because such may reflect a pressure value diminished due to line leaks in the conduit assemblies. Control unit 42 then passes control to step S140.

At step S140, the invention provides for informing the operator that control unit 42 completed the target tire pressure learning routine. Control unit 42 illuminates a lamp for a duration, then extinguishes the lamp. Control unit also displays the value of the target tire pressure established. Control unit 42 may provide the target tire pressure information to another, such as a machine, via any data transmission convention, which may process same, or an individual, via any broadcast convention, interested in same. Control unit 42 then passes control to step S145.

At step S145, the invention provides for returning control to a main program (not shown).

While the invention has been particularly shown and described with reference to the preferred embodiments thereof, it is well understood by those skilled in the art that various changes and modifications can be made in the invention without departing from the spirit and scope of the invention.

We claim:

1. A method for controlling a tire pressure in a tire maintained by a tire pressure management system, comprising the steps of:
    supplying pressurized fluid from a fluid source to a conduit disposed between said fluid source and said tire for a first predetermined time period sufficient to open a wheel valve disposed at one end of an axle supporting a wheel on which said tire is mounted;
    measuring a first conduit pressure in said conduit with a sensor disposed in said conduit following a second predetermined time period;
    storing said first conduit pressure as a target tire pressure; and,
    maintaining said tire pressure in said tire equal to said target tire pressure.

2. The method of claim 1, further comprising the steps of:
    providing pressurized fluid from said fluid source to said conduit to pressurize said conduit to a supply pressure;
    measuring said supply pressure in said conduit with said sensor; and,
    comparing said supply pressure to a predetermined minimum pressure.

3. The method of claim 2, further comprising the step of clearing a flag in a memory if said supply pressure exceeds said predetermined minimum pressure.

4. The method of claim 1, further comprising the steps of:
    measuring a second conduit pressure in said conduit with said sensor following a third predetermined time period; and,
    comparing a difference between said first and second conduit pressures to a predetermined line leak pressure.

5. The method of claim 4, further comprising the step of setting a line leak indicator if said difference exceeds said predetermined line leak pressure.

6. The method of claim 1, further comprising the step of providing an indicator of said target tire pressure to an operator of a vehicle.

7. The method of claim 6, wherein said indicator comprises a visual indicator.

8. The method of claim 1 wherein said supplying step is initiated in response to a command from an operator of a vehicle.

9. The method of claim 1, further comprising the step of comparing said first conduit pressure to a predetermined minimum target tire pressure.

10. The method of claim 9, further comprising the step of setting a line leak indicator if said first conduit pressure is less than said predetermined minimum target tire pressure.

11. A method for controlling a tire pressure in a tire maintained by a tire pressure management system, comprising the steps of:

supplying pressurized fluid from a fluid source to a conduit disposed between said fluid source and said tire for a first predetermined time period sufficient to open a wheel valve disposed at one end of an axle supporting a wheel on which said tire is mounted;

measuring a first conduit pressure in said conduit with a sensor disposed in said conduit following a second predetermined time period;

measuring a second conduit pressure in said conduit with said sensor following a third predetermined time period;

comparing a difference between said first and second conduit pressures to a predetermined line leak pressure;

setting a line leak indicator if said difference exceeds said line leak pressure;

storing said first conduit pressure as a target tire pressure; and, maintaining said tire pressure in said tire equal to said target tire pressure.

12. The method of claim 11, further comprising the steps of:

providing pressurized fluid from said fluid source to said conduit to pressurize said conduit to a supply pressure;

measuring said supply pressure in said conduit with said sensor; and, comparing said supply pressure to a predetermined minimum pressure.

13. The method of claim 12, further comprising the step of clearing a flag in a memory if said supply pressure exceeds said predetermined minimum pressure.

14. The method of claim 11, further comprising the step of providing an indicator of said target tire pressure to an operator of a vehicle.

15. The method of claim 14 wherein said indicator comprises a visual indicator.

16. The method of claim 11 wherein said supplying step is initiated in response to a command from an operator of a vehicle.

17. The method of claim 11, further comprising the step of comparing said first conduit pressure to a predetermined minimum target tire pressure.

18. The method of claim 17, further comprising the step of setting a line leak indicator if said first conduit pressure is less than said predetermined minimum target tire pressure.

19. A method for controlling a tire pressure in a tire maintained by a tire pressure management system, comprising the steps of:

supplying pressurized fluid from a fluid source to a conduit disposed between said fluid source and said tire for a first predetermined time period sufficient to open a wheel valve disposed at one end of an axle supporting a wheel on which said tire is mounted;

measuring a first conduit pressure in said conduit with a sensor disposed in said conduit following a second predetermined time period;

comparing said first conduit pressure to a predetermined minimum target tire pressure;

setting a line leak indicator if said first conduit pressure is less than said predetermined minimum target tire pressure;

measuring a second conduit pressure in said conduit with said sensor following a third predetermined time period;

comparing a difference between said first and second conduit pressures to a predetermined line leak pressure;

setting said line leak indicator if said difference exceeds said line leak pressure;

storing said first conduit pressure as a target tire pressure; and, maintaining said tire pressure in said tire equal to said target tire pressure.

20. The method of claim 19, further comprising the step of providing an indicator of said target tire pressure to an operator of a vehicle.

* * * * *